United States Patent [19]

Robinson

[11] Patent Number: 4,677,032

[45] Date of Patent: Jun. 30, 1987

[54] VERTICAL MAGNETIC RECORDING MEDIA WITH MULTILAYERED MAGNETIC FILM STRUCTURE

[75] Inventor: Clifford J. Robinson, San Jose, Calif.

[73] Assignee: International Business Machines Corporation, Armonk, N.Y.

[21] Appl. No.: 779,324

[22] Filed: Sep. 23, 1985

[51] Int. Cl.$^4$ ............................................. H01F 1/00
[52] U.S. Cl. .................................. 428/611; 428/626; 428/630; 428/634; 428/641; 428/651; 428/652; 428/678; 428/607; 428/928; 428/679; 428/680; 428/681
[58] Field of Search ..................... 360/134, 135, 136; 428/607, 611, 626, 678, 928, 630, 634, 641, 651, 670, 681, 680, 679, 652

[56] References Cited

U.S. PATENT DOCUMENTS

| | | | |
|---|---|---|---|
| 4,548,871 | 10/1985 | Kobayashi et al. | 428/611 |
| 4,592,948 | 6/1986 | Kohmoto et al. | 428/216 |
| 4,594,296 | 6/1986 | Noguchi et al. | 428/610 |
| 4,599,280 | 7/1986 | Izumi et al. | 428/694 |

FOREIGN PATENT DOCUMENTS

| | | | |
|---|---|---|---|
| 140513 | 5/1985 | European Pat. Off. | |
| 3440386 | 5/1985 | Fed. Rep. of Germany | |
| 094520 | 11/1981 | Japan | |
| 179942 | 5/1982 | Japan | |
| 59-139138 | 8/1984 | Japan | 428/611 |

OTHER PUBLICATIONS

"Magnetization and Structure of Mn–Ni and Mn–Co Layered Magnetic Thin Films", J. Appl. Phys. 53(3), Mar. 1982, pp. 2436-2438.

"High Density Perpendicular Magnetic Recording on Rigid Disks", Fujitsu Sci. Tech. J., 19, 1, pp. 99–126, Mar. 1983.

"Recording on Perpendicular Anisotropy Media with Ring Heads", IEEE Transactions on Magnetics, vol. Mag-17, No. 6, Nov. 1981, pp. 2547–2549.

Primary Examiner—John P. Sheehan
Attorney, Agent, or Firm—Thomas R. Berthold

[57] ABSTRACT

A thin film metal alloy medium for vertical recording has a magnetic film structure of individual films, each film being made up of a non-magnetic layer and a magnetic layer. In a preferred embodiment of the medium, each of the layers is a cobalt-chromium-tantalum (CoCrTa) alloy, the tantalum concentration being varied in the different layers in order to provide either the non-magnetic or the magnetic properties to the layers. The medium also includes a soft magnetic underlayer film structure between the substrate and the magnetic film structure to provide a magnetic flux return path. Each film in the underlayer film structure comprises a CoCrTa non-magnetic layer and a CoCrTa magnetic layer, each magnetic layer being sufficiently thin such that the underlayer film structure exhibits in-plane magnetization with no perpendicular magnetic anisotropy.

9 Claims, 6 Drawing Figures

VERTICAL MAGNETIC RECORDING MEDIA WITH MULTILAYERED MAGNETIC FILM STRUCTURE

TECHNICAL FIELD

This invention relates to thin film metal alloy media for vertical magnetic recording, and in particular to such media with a multilayered magnetic film structure having an improved ratio of perpendicular to horizontal coercivity.

BACKGROUND OF THE INVENTION

In thin film metal alloy media for vertical magnetic recording, the magnetic film is typically a single layer of a magnetic alloy having an ordered crystalline structure with its easy axis of magnetization oriented generally perpendicular to the substrate. One type of material used as the magnetic film is a cobalt-chromium (CoCr) alloy which is sputter-deposited on the substrate, or on an intermediate nucleating layer deposited on the substrate, to form a film having a hexagonal close packed (hcp) crystalline structure with the [00.2] axis (the C-axis) oriented generally perpendicular to the substrate. The magnetic properties of thin film metal alloy vertical recording media made with various substrates, a titanium (Ti) nucleating layer and a single-layer CoCr perpendicular magnetic film are described by Kobayashi, et al. in "High Density Perpendicular Magnetic Recording On Rigid Disks", *Fujitsu Scientific & Technical Journal*, Vol. 19, No. 1 (March 1983), pp. 99–126. The magnetic properties of vertical recording media with an 8000 Angstrom cobalt-chromium-tantalum (CoCrTa) magnetic film deposited on a 1000 Angstrom Cr nucleating layer are described by Langland and Albert in "Recording on Perpendicular Anisotropy Media with Ring Heads", *IEEE Transactions on Magnetics*, Vol. MAG-17, No. 6 (November 1981), pp. 2547–2549.

In order to achieve a sufficiently high perpendicular coercivity with a single-layer CoCr or CoCrTa alloy magnetic film, it is necessary that a relatively high temperature be applied to the substrate during the sputter deposition process. This limits the formation of CoCr or CoCrTa alloy films to particular types of substrates, such as an aluminum-magnesium (AlMg) alloy or silicon. In addition to high perpendicular coercivity, another desired property of vertical magnetic recording media is a high ratio of perpendicular to horizontal coercivity. When a single layer CoCr alloy film is used as the magnetic layer, the in-plane or horizontal coercivity is relatively high, which limits the achievable value of this ratio. Even though both the perpendicular and horizontal coercivities of a CoCr film are known to increase with an increase in substrate temperature during film deposition, the ratio of perpendicular to horizontal coercivity remains relatively constant regardless of the temperature of the substrate during deposition.

SUMMARY OF THE INVENTION

The invention is an improved vertical recording media in which the magnetic film structure comprises a multiplicity of films, each film being made up of a layer of non-magnetic material and a layer of a magnetic alloy including cobalt and chromium. Because the magnetic layers in the film structure are separated by non-magnetic layers, it is believed that magnetic flux reversal is impeded, thereby increasing the perpendicular coercivity. This multilayered film structure has a perpendicular coercivity greater, and a horizontal coercivity less, than a single magnetic layer of the same alloy of the same thickness.

In one embodiment of the invention, the magnetic CoCrTa alloy layers in each of the films are of a thickness less than the known thickness at which perpendicular magnetic orientation of a single layer of CoCrTa occurs. However, the multilayered film structure still exhibits perpendicular magnetic anisotropy, apparently because of dipole coupling between the separated magnetic layers.

Because the magnetic film structure is made up of a multiplicity of films, each film comprising a non-magnetic layer and a magnetic layer, the perpendicular coercivity of the film structure is greater than a single-layer film of the same thickness. This permits vertical recording media with satisfactory perpendicular coercivity to be formed by deposition onto substrates at low temperature. Thus alternative substrate materials which cannot withstand high temperatures may be used.

The invention also includes an improved soft magnetic underlayer film structure between the magnetic film structure and the substrate to provide a magnetic flux return path when the media is used with vertical magnetic recording pole heads located on the same side of the media. The underlayer film structure also comprises a multiplicity of films, each film being made up of a non-magnetic and a magnetic layer, but in which each magnetic layer is sufficiently thin so that magnetization within each magnetic layer is horizontal. This underlayer film structure exhibits horizontal magnetization and provides a soft magnetic material with very low in-plane coercivity.

In one embodiment of the invention both the perpendicular magnetic film structure and the soft magnetic underlayer film structure are formed of the same materials, i.e. alloys of cobalt, chromium and tantalum (CoCrTa), by altering the tantalum concentration in the magnetic and non-magnetic layers. This permits the media to be fabricated by sputter deposition in a single pump down of the sputtering chamber and with a single set of sputtering targets.

For a fuller understanding of the nature and advantages of the present invention, reference should be made to the following detailed description taken in conjunction with the accompanying drawings.

DESCRIPTION OF THE PREFERRED EMBODIMENTS

Figure 1:
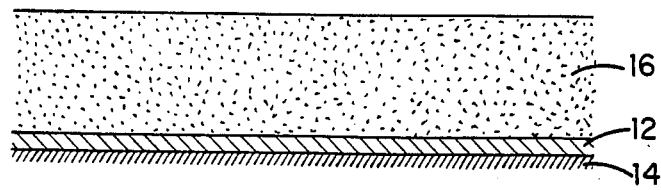
FIG. 1 is a sectional view of a vertical recording medium with a conventional single magnetic layer of CoCrTa on a CoCrTa non-magnetic nucleating layer.

A conventional vertical recording medium with a single CoCrTa alloy magnetic layer is depicted in the sectional view of FIG. 1. The medium represented in FIG. 1 was formed by first sputter depositing a cobalt-chromium-tantalum (CoCrTa) nucleating layer 12 on a polyimide substrate 14. The CoCrTa magnetic layer 16 has a composition, in atomic percent (at. %), of $(Co_{85}Cr_{15})_{90}Ta_{10}$ and a thickness of approximately 5000 Angstroms. The nucleating layer 12, which is 500 Angstroms thick and non-magnetic because of the relatively high amount of Ta present, i.e. $(Co_{85}Cr_{15})_{70}Ta_{30}$, serves to improve the preferred crystalline orientation of the subsequently deposited magnetic layer 16. The single magnetic layer 16 is sputter deposited to a thickness of 5000 Angstroms on the nucleating layer 12. The deposition of layers 12 and 16 occurred at a substrate temperature of 200° C.

Figure 2:
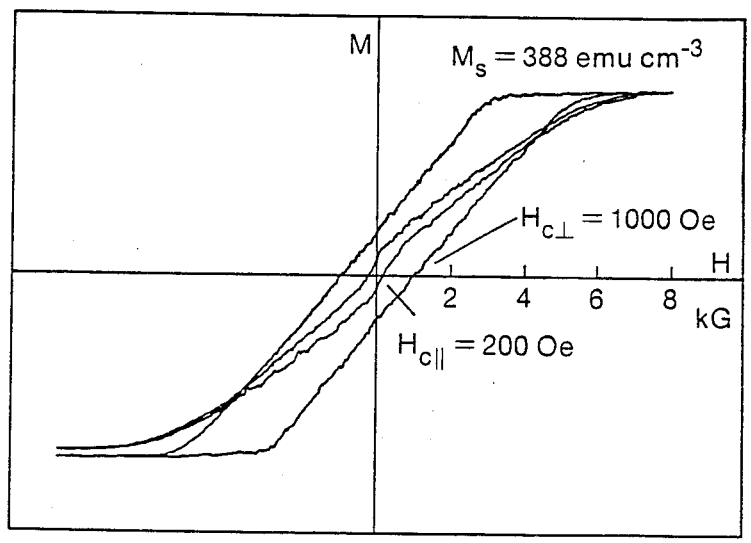
FIG. 2 is an M-H hysteresis loop for the medium shown in FIG. 1.

The M-H hysteresis loop for the CoCrTa medium of FIG. 1 is shown in FIG. 2. The medium has a perpendicular coercivity of 1000 Oersteds (Oe) and a horizontal coercivity of 200 Oe for a ratio of perpendicular to horizontal coercivity of approximately 5. The structure of the conventional single-layer medium of FIG. 1 and its corresponding M-H hysteresis data of FIG. 2 are typical for single-layer alloys containing Co and Cr used for vertical recording. Both the perpendicular and horizontal coercivities of single layer CoCr films are known to increase with increased substrate deposition temperature, but the ratio of the perpendicular to horizontal coercivity remains relatively constant in the range of approximately 4 to 5.

Figure 3:
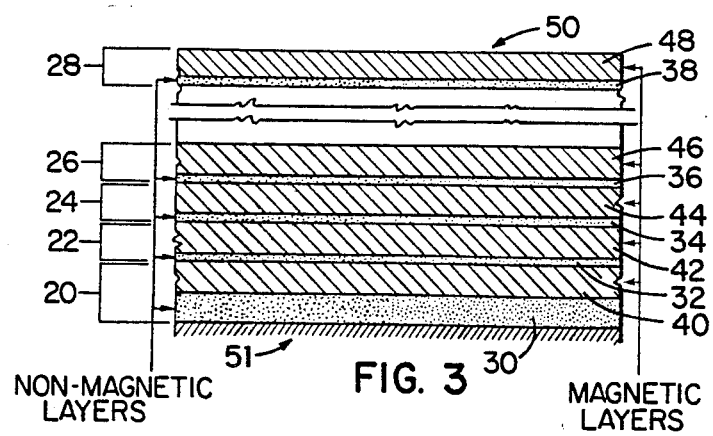
FIG. 3 is a sectional view of a medium with the multilayered magnetic film structure according to the present invention.

A vertical recording medium according to the present invention is represented in sectional view in FIG. 3. The multilayered magnetic film structure 50 is deposited on a suitable substrate, e.g. polyimide substrate 51, and comprises a multiplicity of films, such as typical films 20, 22, 24, 26 and 28. Each film 22, 24, 26 and 28 is made up of a non-magnetic layer of approximately 200 Angstroms thickness and a magnetic layer of approximately 500 Angstroms deposited on the non-magnetic layer. Although only films 20, 22, 24, 26 and 28 are represented in FIG. 3, the actual film structure is formed of eight such films. The non-magnetic layers in each film are designated 30, 32, 34, 36 and 38 and the magnetic layers are designated 40, 42, 44, 46 and 48. The initial non-magnetic layer 30 deposited on substrate 51 is less well oriented than the subsequent layers and thus has a thickness of approximately 500 Angstroms, as compared to 200 Angstroms for the other non-magnetic layers. The total thickness of the film structure in FIG. 3 is approximately 5200 Angstroms. The composition, in at. %, is $(Co_{85}Cr_{15})_{70}Ta_{30}$ for the non-magnetic layers and $(Co_{85}Cr_{15})_{90}Ta_{10}$ for the magnetic layers.

The magnetic film structure 50 was formed by sputter deposition with dual targets, a $Co_{85}Cr_{15}$ target and a Ta target, in a single pump down of the sputtering chamber. The substrate temperature was maintained at 200° C. and the Argon pressure in the chamber was approximately $3 \times 10^{-3}$ Torr. In the particular sputtering apparatus used in forming the film structure 50 the $Co_{85}Cr_{15}$ target was connected to a DC power source and the Ta target was connected to an RF power source. The individual magnetic and non-magnetic layers making up film structure 50 were formed by modulating the RF power to the Ta target to thereby alter the Ta composition in each of the individual layers. Thus it is possible to consider the magnetic film structure 50 as a "single" film in which the Ta composition is merely modulated or varied at different points in the overall film structure to produce the individual non-magnetic and magnetic CoCrTa layers.

Thin films of CoCrTa, with a Ta concentration less than approximately 30 at. %, possess a magnetocrystalline anisotropy derived from cobalt's hexagonal structure. It is known that a single CoCrTa film of 500 Angstroms thickness exhibits horizontal magnetization. However, in the magnetic film structure 50, even though the individual magnetic layers, i.e. layers 40, 42, 44, 46 and 48, are each 500 Angstroms thick, the overall film structure exhibits perpendicular magnetization. This suggests that there is magnetostatic coupling between the individual magnetic layers which causes the overall magnetic orientation to be perpendicular to the substrate.

Figure 4:
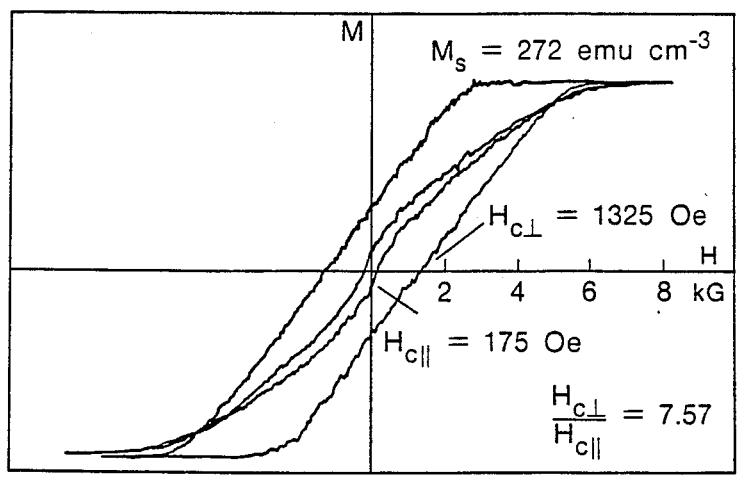
FIG. 4 is an M-H hysteresis loop for the medium represented in FIG. 3.

The M-H loop for the magnetic film structure 50 is shown in FIG. 4. The magnetic film structure 50 has a perpendicular coercivity of 1325 Oe and a horizontal coercivity of 175 Oe, which results in a ratio of perpendicular to horizontal coercivity of 7.57. This value is a substantial improvement over that for the conventional single-layer CoCr or CoCrTa films.

The film structure 50 has substantially the same thickness of magnetic material as the conventional single layer CoCrTa, yet a significantly higher perpendicular coercivity. It is believed that one of the reasons for this is that the non-magnetic layers 30, 32, 34, 36 and 38 in each of the films 20, 22, 24, 26 and 28 inhibit magnetic flux reversal in the magnetic layers, thereby increasing the overall perpendicular coercivity.

In the multilayered magnetic film structure 50, the magnetization is perpendicular to the plane of the film. However, when magnetization is aligned horizontally by an external magnetic field applied in the plane of the film structure, the magnetostatic coupling between the magnetic layers vanishes and the individual magnetic layers behave separately. Thus the magnetization reversal takes place independently within each layer. The non-magnetic layers play no role in this process and thus have no effect on the in-plane coercivity. The lower in-plane coercivity of the film structure 50, as compared to single-layer CoCr or CoCrTa films, apparently results only from the fact that lower in-plane coercivity is an intrinsic property of thinner films.

While in the embodiment shown in FIG. 3, the preferred non-magnetic material is CoCrTa with a Ta concentration greater than approximately 30 at. % in order to assure the non-magnetic property of the CoCrTa alloy, other types of non-magnetic material may also form the non-magnetic layers in the film structure.

Figure 5:
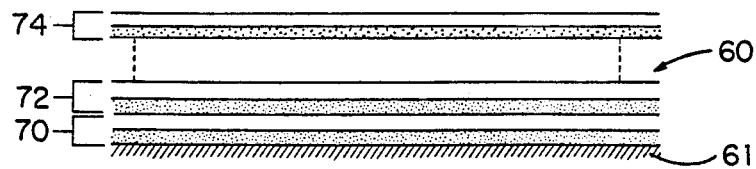
FIG. 5 is a sectional view of the underlayer film structure according to the present invention which provides a magnetic flux return path when formed between the substrate and the magnetic film structure represented in FIG. 3.
Figure 6:
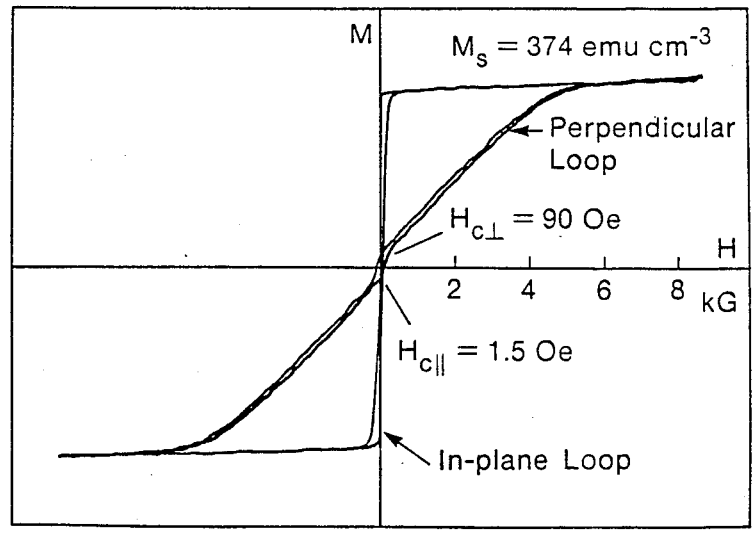
FIG. 6 is an M-H hysteresis loop for the underlayer film structure represented in FIG. 5.

In those applications of the vertical recording media where it is desired to utilize pole heads on the same side of the media, such as in a flexible disk application, it is necessary to have an underlayer which provides a magnetic flux return path in the media, such as a conventional underlayer of nickel-iron (NiFe). An underlayer according to the present invention which provides such a magnetic flux return path is shown in FIG. 5. This underlayer film structure 60 is a second film structure which is deposited between the substrate and the magnetic film structure depicted in FIG. 3. The underlayer film structure 60 comprises a multiplicity of films, such as typical films 70, 72 and 74, each film being made up of a non-magnetic and a magnetic layer, formed on substrate 61. Each layer is a CoCrTa alloy of approximately 150 Angstroms thickness. The Ta concentration is 50 at. % in the non-magnetic layers and 10 at. % in the magnetic layers. Because each of the films 70, 72 and 74 is substantially thin, i.e. on the order of approximately 150 Angstroms, only in-plane magnetization is observed and there is no magnetostatic coupling between the magnetic layers. Thus the underlayer film structure exhibits no perpendicular magnetic anisotropy. Each of the magnetic layers retains its magnetization in the plane of the film structure, even when the underlayer film structure 60 is deposited to a total thickness of approximately 1000 Angstroms. As shown in the M-H loop of FIG. 6, the underlayer film structure 60 has an extremely low horizontal coercivity of approximately 1.5 Oe.

The underlayer film structure 60 was fabricated under the same sputtering conditions as described previously for the magnetic film structure 50 with the exception that the substrate was maintained at 110° C. Thus a vertical recording medium according to the present invention containing the soft magnetic underlayer film structure as a magnetic flux return path and the multi-layered magnetic film structure can be fabricated with a single set of targets in a single pump down of the sputtering chamber by merely modulating the power to the Ta target.

The above description and the drawings relate only to the inventive structure which form a part of the vertical recording media, and not to the conventional well-known portions of the media and the media fabrication processes. For example, in the fabrication of thin film metal alloy disks, it is known to provide a protective overcoat, such as a sputtered carbon film, over the magnetic film and, in certain instances, to provide an adhesion layer, such as sputtered titanium film, between the overcoat and the magnetic film.

While Ta was used as the alloy to form the ternary CoCrX alloy for both the magnetic and non-magnetic layers in the film structures 50 and 60, other refractory metals, such as tungsten (W), titanium (Ti), niobium (Nb) or vanadium (V) may be used in place of Ta. It is also possible to form the film structures of the present invention by means other than sputter deposition, including chemical vapor deposition, evaporation, molecular beam epitaxy, or plasma deposition.

While the preferred embodiments of the present invention have been illustrated in detail, it should be apparent that modifications and adaptations of those embodiments will occur to those skilled in the art without departing from the scope of the present invention as set forth in the following claims.

What is claimed is:

1. A perpendicular magnetic recording medium comprising:
   a substrate; and
   a magnetic film structure of a multiplicity of films formed on the substrate, each film comprising a layer of non-magnetic material and a layer of a magnetic metal alloy comprising cobalt and chromium formed on the layer of non-magnetic material, the magnetic film structure having perpendicular magnetic anisotropy.

2. The medium according to claim 1 further comprising a protective overcoat formed on the magnetic film structure.

3. The medium according to claim 1 wherein the magnetic metal alloy comprises cobalt, chromium and an element from the group consisting of tantalum, niobium, tungsten, titanium and vanadium.

4. The medium according to claim 1 wherein the layer of non-magnetic material and the layer of magnetic metal alloy in each of the films are alloys consisting of the same elements.

5. The medium according to claim 1 further comprising a soft magnetic underlayer between the substrate and the magnetic film structure for providing a magnetic flux return path.

6. The medium according to claim 5 wherein the soft magnetic underlayer further comprises an underlayer film structure of a multiplicity of films, each film in the underlayer film structure comprising a layer of non-magnetic material and a layer of a magnetic metal alloy comprising cobalt and chromium formed on the layer of non-magnetic material, each layer of magnetic metal alloy in the underlayer film structure being sufficiently thin such that the underlayer film structure exhibits no perpendicular magnetic anisotropy.

7. The medium according to claim 6 wherein the magnetic metal alloy in the underlayer film structure comprises cobalt, chromium and an element selected from the group consisting of tantalum, niobium, tungsten, titanium and vanadium.

8. The medium according to claim 6 wherein the layer of non-magnetic material and the layer of magnetic metal alloy in each of the films in the underlayer film structure are alloys consisting of the same elements.

9. The medium according to claim 8 wherein the alloys in the magnetic film structure and the underlayer film structure consist of the same elements.

* * * * *